INVENTORS.
Walter J. Schrenk
Harold A. Walters
BY
ATTORNEY

United States Patent Office 3,549,405
Patented Dec. 22, 1970

3,549,405
IRIDESCENT RESINOUS FILM BODIES AND A SUBSTRATE COATED THEREWITH
Walter J. Schrenk, Bay City, and Harold A. Walters, Beaverton, Mich., assignors to The Dow Chemical Company, Midland, Mich., a corporation of Delaware
Continuation-in-part of application Ser. No. 431,422, Feb. 9, 1965. This application Mar. 29, 1965, Ser. No. 445,852
Int. Cl. B44d 5/06; B44f 1/14
U.S. Cl. 117—33                    12 Claims

ABSTRACT OF THE DISCLOSURE

A decorative plastic material is disclosed which consists of particles of plastic film. The plastic film is iridescent. The iridescence is caused by a number of thin layers of plastics with different refractive indices.

---

This application is a continuation-in-part of our copending application Ser. No. 431,422, filed Feb. 9, 1965, now abandoned.

This invention relates to an improved coating and coating material. It more particularly relates to an attractive iridescent coating.

Various decorative coatings incorporating a variety of elements of sufficient size to be distinguished with the method have been employed for many years. Such coatings include sand, ground shell, fibers, and like particulate elements. It would be advantageous to have available an iridescent coating which was flexible and was, in fact, essentially a two dimensional coating. By the term "two dimensional coating" is meant a coating which forms a generally flat surface and does not have irregularities of greater than about 10–15 mils. It would also be advantageous if there were available an iridescent particulate material which was not brittle, abrasive in nature, and could be readily incorporated in or on known and conventional coatings. Further, it would be desirable if there were available a particulate iridescent material which was capable of forming attractive coatings of a thermoplastic resinous nature.

These benefits in general are achieved employing a particulate mass of synthetic resinous thermoplastic bodies having a thickness up to about 10 mils and being composed of a plurality of generally parallel layers of transparent thermoplastic resinous material wherein at least about 20 percent of the layers have a thickness of between about 0.05 micron and about 5 microns and preferably 0.05 to 1 micron for maximum iridescent effect, and adjacent layers differ in refractive index from each other by at least about 0.03, the number of layers being at least 10 and beneficially being at least 50.

The iridescent bodies in accordance with the invention are beneficially employed to form an iridescent coating comprising a substrate, the substrate having a binder thereon, the binder adhering a plurality of synthetic resinous thermoplastic bodies having a thickness up to about 10 mils and being composed of a plurality of generally parallel layers of transparent thermoplastic resinous material wherein at least about 20 percent of the layers have a thickness of between about 0.05 micron and about 5 microns and preferably 0.05 to 1 micron for maximum iridescent effect, and adjacent layers differ in refractive index from each other by at least about 0.03, the number of layers being at least 10 and beneficially being at least 50.

Further features and advantages of the present invention will become more apparent from the following specification when taken in connection with the drawing wherein:

In FIG. 1 there is schematically depicted a coated substrate in accordance with the invention;

Figure 1:
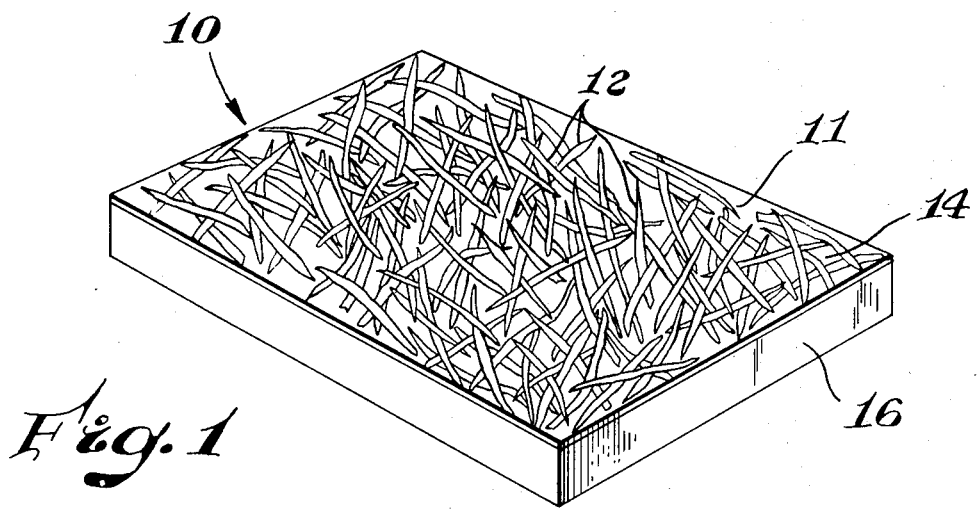

In FIG. 1 there is illustrated a coating generally designated by the reference numeral 10. The coating 10 comprises a binder or adhesive layer 11 having adhered thereto a plurality of synthetic resinous thermoplastic iridescent bodies or particles 12, substantially randomly distributed upon a surface 14 of the binder 11. A substrate 16 is adhered to the binder 11 and provides support therefor.

Figure 2:
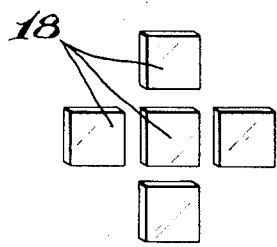
FIGS. 2, 3 and 4 depict some of the various forms of the bodies of the invention.

FIG. 2 depicts a plurality of generally rectangular particles 18 of an iridescent nature suitable for use in accordance with the coatings.

Figure 3:
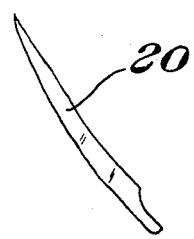

FIG. 3 depicts an elongated fibroid iridescent film element or body for preparation of coatings.

Figure 4:
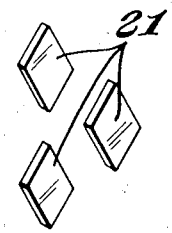

FIG. 4 depicts a plurality of generally rhomboidal iridescent thermoplastic resinous particles 21.

Figure 5:
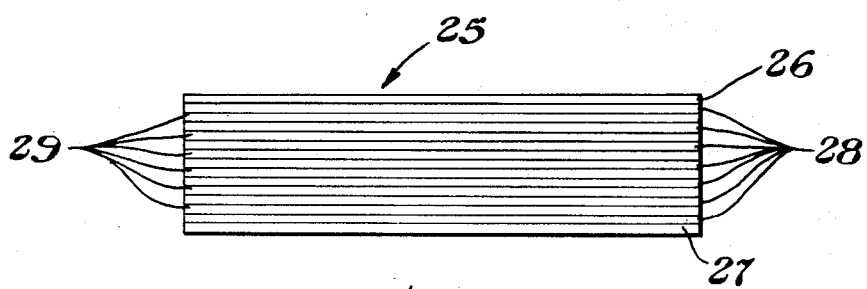
FIG. 5 is a schematic representation of a cross section of the iridescent particulate bodies.

FIG. 5 is a schematic end view of an iridescent body or particle in accordance with the invention generally designated by the reference numeral 25. The particle 25 comprises a first surface layer 26, a second surface layer 27, a plurality of first intermediate layers 28 and a plurality of second intermediate layers 29. The layers 28 and 29 are of diverse transparent thermoplastic resinous materials having a refractive index difference greater than about 0.03. The layers 28 and 29 are adhered to adjacent layers to form a solid transparent iridescent object. At least 20 percent of the layers have a thickness between about 0.05 micron and about 5 microns and preferably 0.05 to 1 micron for maximum iridescent effect.

The iridescent synthetic thermoplastic resinous elements are readily prepared in the form of thin sheets or film beneficially having thicknesses from about 0.25 to about 10 mils by the simultaneous extrusion of a plurality of layers of diverse thermoplastic resinous materials and subsequently stretching the extrude at a thermoplastic temperature until the thickness of the composite sheet and the layers therein are reduced to the desired level. Beneficially, such a composite sheet can be obtained by the simultaneous extrusion of a plurality of layers from a single die or by preparing a composite sheet by hot lamination of film or extrude to provide the desired number of layers, heating the composite sheet to a thermoplastic temperature and reducing its thickness by stretching. Alternately, such a sheet is prepared by a coating or casting technique wherein thin layers of diverse thermoplastic resinous materials are deposited on a substrate and subsequently from the substrate. In order to achieve a satisfactory iridescent effect, the layers of material must be deposited in such a manner that a relatively sharp interface is maintained. Such an interface can be maintained by the use of synthetic resinous materials in solvents which are solvents only for one of the materials. Thus, distinct layers are obtained having a sharp interface and as successive layers are deposited, the iridescent effect increases. About 10 layers are satisfactory for minimal iridescent effect. However, beneficially, about 50 is usually the number of minimum layers suitable for a relatively intense iridescent effect and desirably composite structures having 100–500 layers are employed for maximum iridescent effect. To further clarify the requirements for a film showing iridescence, it must have at least two pairs of adjacent discontinuities in refractive index, each member of the pair being separated by a distance of from about 0.05 to about 5 microns and preferably 0.05 to 1 micron for maximum iridescent effect. That is, the iridescent film shall have within the body of the film two layers having a thickness of about 0.05 micron to about 5 microns and preferably 0.05 to 1 micron for maximum iridescent effect, and differing from the adjacent portions of the body in refractive index by at least 0.03. Thus, the layers within the film which are responsible for the iridescence are restricted in thickness between the foregoing limits and may be bonded to each other by other layers in the body which are transparent and may be thicker, thinner, or equal to the thickness of the layers, giving rise to iridescence. Maximum iridescence is achieved generally when two or more materials are interlayered which have a maximum difference in refractive index and all of the layers lie within the range of 0.05 micron to 5 microns and preferably 0.05 to 1 micron for maximum iridescent effect. Thicker iridescent films, that is, those approaching 10 mils in thickness, may have many layers thicker than 5 microns while the thinner films having an equal degree of iridescence have layers less than 0.05 micron. Multilayer film having all layers less than about 0.05 micron or having no layers within the range of about 0.05 micron to about 5 microns does not exhibit the desirable iridescent characteristic. Beneficially, once the composite iridescent film is prepared, it is then cut or processed into the desirable shapes such as elongated strips, rectangles, circles and even chopped into random shapes, depending upon the desired effect. Oftentimes particularly attractive effects are obtained by using film having layers of various thicknesses so that the iridescent colors obtained are varied.

A wide variety of synthetic resinous thermoplastic materials can be employed. The only essential elements are that the thermoplastic materials be transparent and that they have the required difference in refractive index. In the simplest case, alternating layers of two diverse materials may be employed. However, three, four, five or even more diverse resinous materials may be utilized, as in thin layers, the chemical composition of the polymers does not appear to be critical. Because of the thickness of the layers, an adequate adhesion is obtained either by coextrusion or by coating processes.

Beneficially, attractive iridescent films are prepared from a wide variety of synthetic resinous thermoplastic materials including the materials hereinafter tabulated with their refractive index.

TABLE 1

| Polymer name: | Refractive index |
|---|---|
| Polytetrafluoroethylene | 1.35 |
| FEP (fluorinated ethylene propylene copolymer) | 1.34 |
| Polyvinylidenefluoride | 1.42 |
| Polychlorotrifluoroethylene | 1.42 |
| Polybutyl acrylate | 1.46 |
| Polyvinyl acetate | 1.47 |
| Ethyl cellulose | 1.47 |
| Polyformaldehyde | 1.48 |
| Polyisobutyl methacrylate | 1.48 |
| Polybutyl methacrylate | 1.48 |
| Polymethyl acrylate | 1.48 |
| Polypropyl methacrylate | 1.48 |
| Polyethyl methacrylate | 1.48 |
| Polymethyl methacrylate | 1.49 |
| Cellulose acetate | 1.49 |
| Cellulose propionate | 1.49 |
| Cellulose acetate-butyrate | 1.49 |
| Cellulose nitrate | 1.49 |
| Polyvinyl butyral | 1.49 |
| Polypropylene | 1.49 |
| Low density polyethylene (branched) | 1.51 |
| Polyisobutylene | 1.51 |
| Natural rubber | 1.52 |
| Perbunan | 1.52 |
| Polybutadiene | 1.52 |
| Nylon (condensation copolymer of hexamethylene-diamine and adipic acid) | 1.53 |
| Polyvinyl chloroacetate | 1.54 |
| Polyvinylchloride | 1.54 |
| Polyethylene (high density linear) | 1.54 |
| A copolymer of 67 parts by weight methyl methacrylate and 33 parts by weight styrene | 1.54 |
| A copolymer of 85 parts by weight vinyl chloride and 15 parts by weight vinylidene chloride | 1.55 |
| Poly-α-methylstyrene | 1.56 |
| A copolymer of 60 parts by weight styrene and 40 parts by weight butadiene | 1.56 |
| Neoprene | 1.56 |
| A copolymer of 70 parts by weight styrene and 30 parts by weight acrylonitrile | 1.57 |
| Polycarbonate resin | 1.59 |
| Polystyrene | 1.60 |
| A copolymer of 85 parts by weight vinylidene chloride and 15 parts by weight vinyl chloride | 1.61 |
| Polydichlorostyrene | 1.62 |

By selecting combinations which have a difference in refractive index of at least 0.03, an iridescent film results. However, for maximum iridescence, beneficially the difference is about 0.1. When multilayer films are prepared using three or more components, iridescence is obtained when at least some of the adjacent layers exhibit the desired difference in refractive index.

The binder or adhesive employed can be selected from a wide variety of materials. The critical and essential characteristic of the binder is that it adheres the particles to the substrate. The binder must not be a solvent for the iridescent elements or otherwise chemically destroy them. Generally, synthetic film forming latexes are beneficially employed as a binder to adhere the particles to a substrate as most synthetic resinous materials are generally insensitive to water. However, lacquers, drying oils, varnishes, and the like are employed with equal benefit provided the solvent characteristics for the transparent iridescent elements do not destroy them. Beneficially, coatings in accordance with the present invention may be made by either admixing a mass of the iridescent particles with a binder and subsequently coating the substrate with the resultant coating composition or alternately applying the binder to the substrate and before the binder hardens or dries as the case may be, applying a layer of the iridescent particles to the surface of the binder and thereby wetting at least a portion of the iridescent particles with the partially dried or hardening but still tacky binder, and thereby retaining a number of the iridescent particles in the desired position. Maximum iridescence is achieved if the particles are applied on the outer surface of the binder, whereas maximum durability is obtained by incorporating the particles within the binder. The binder or iridescent coating composition is readily applied to a substrate by spraying, brushing, dipping, rolling and like well known coating methods. Beneficially, wherein a coating composition consisting essentially of binder and elongated particles is employed, a generally uniform pattern is obtained by brushing, and generally a minimum of iridescence is noted, whereas spraying provides a maximum random distribution or orientation of the particles and a maximum degree of iridescence.

Beneficially, when particles are applied to a hardening or drying substrate, they are dusted onto the surface, carried in an air stream, a mass of particles applied to the surface and subsequently the unadhered particles removed by an air stream or gravity, brushes or the like. Oftentimes to provide a surface having maximum uniformity, the iridescent film particles are gently pressed into the drying or hardening substrate by means of a roll such as a felt roll or a roll coated with a material that is non-adherent to the binder.

By way of further illustration, a composite thermoplastic resinous film was prepared having about 125 layers wherein alternate layers were polystyrene, and the remaining layers were polymethyl methacrylate. Each of the polymethyl methacrylate layers had a thickness of about 0.05 micron and a total thickness of the film was about 1 mil. The film was then shredded to provide a mass of elongated bodies having a width of about 1/16 of an inch and a length of about 1 inch. Five parts by weight of the shredded film were dispersen in 95 parts by weight of water containing one-half of one percent of a wetting agent commercially available under the trade name of "Dowfax 9N9," a polyoxyethylene alkylphenol. The resultant slurry was admixed with 202 parts by weight of a 47 percent solids synthetic latex containing a polymer of 67 parts of ethyl acrylate and 33 parts of methyl methacrylate together with 20 parts by weight of a 5 percent by weight solution of a thickening agent commercially available under the trade name of "Acrysol GS," a sodium salt of polyacrylic acid. The resultant coating composition was applied to various surfaces including glass, wood, metal, polystyrene, and resulted in an attractive iridescent coating. A glass surface was coated with a 47 percent solids aqueous dispersion of a polymer of 67 parts by weight ethyl acrylate and 33 parts by weight methyl methacrylate and immediately sprinkled with finely divided particles of the previously described iridescent film before the latex coating could dry. This resulted in an iridescent coating having a significantly greater degree of iridescence than the previous illustration.

When the procedure of the previous illustration was repeated employing a white latex paint, a particularly brilliant iridescent coating was obtained. A transparent polyester pressure sensitive tape was sprinkled with a plurality of fibers formed from an iridescent film. The fibers were about 1/32 of an inch in width and about 1/2 inch in length and pressed into the pressure sensitive adhesive with a roller resulting in an exceptionally brilliant iridescent coating. A quite spectacular result is achieved when the previous illustration is repeated utilizing a black polyester substrate.

Repetition of the foregoing procedures utilizing iridescent film in the form of filaments about 1/16 of an inch in width and about 1 inch in length, film in squares of about 5/32 of an inch per side, and discs of about 1/8 inch in diameter also result in attractive and eye-catching iridescent coatings. Excellent iridescence is also achieved when laminates are prepared of such materials as polyvinylchloride-polystyrene, polystyrene-polyethylene, polypropylene-polystyrene, ethyl cellulose-styrene, polychlorotrifluoroethylene - polypropylene, polyvinylidene-fluoride-poly-α-methylstyrene, polybutyl acrylate-polydichlorostyrene, polybutyl acrylate - polyvinylchloride, polymethyl methacrylate-polycarbonate, cellulose acetatebutyrate-copolymer of 70 parts by weight styrene and 30 parts by weight acrylonitrile, polyformaldehyde high density polyethylene, polyisobutyl methacrylate copolymer of 85 parts by weight vinyl chloride and 15 parts by weight vinylidene chloride, cellulose nitrate-polystyrene, cellulose acetate—a copolymer of 85 parts by weight vinylidene chloride and 15 parts by weight vinyl chloride, polytetrafluoroethylene-polyisobutylene, polyvinyl chloroacetate-polyvinyl acetate, propyl methacrylateneoprene, perbunan-fluorinated ehylenepropylene copolymer, nylon - polyvinylidenefluoride, and the like are employed to form the iridescent film.

The coatings in accordance with the present invention which utilize thin thermoplastic resinous film have a degree of flexibility and an iridescent appearance which is significantly different from known iridescent coatings. Because of the use of thin thermoplastic resinous film, the desired degree of flexibility of the iridescent particles is readily controlled. As the thermoplastic resinous materials are relatively soft when compared with pearlescent or opalescent materials of an inorganic nature, the coatings are relatively nonabrasive and flex and bend to a high degree without crack or loss of optical properties.

Hard or soft binders may be employed depending upon the particular physical characteristics desired in the end product. The iridescent film may be relatively stiff material such as is obtained from a laminate of polystyrene and polymethyl methacrylate or relatively soft, such as is obtained from a laminate of polyethylene containing relatively thin layers of polystyrene.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A mass of unconnected synthetic resinous thermoplastic film bodies, the bodies having a thickness up to about 10 mils and the bodies being composed of a plurality of generally parallel contacting layers of transparent thermoplastic resinous material wherein at least about 20 percent of the layers have a thickness between about 0.05 micron and about 5 microns and adjacent layers differ in refractive index from each other by at least about 0.03 and the number of layers in the bodies being about at least 10, the film bodies having an iridescent appearance caused by refraction and reflection at interfaces between layers.

2. The mass of claim 1 wherein the number of layers is at least 50.

3. The mass of claim 1 wherein the bodies of the mass have a fiber-like configuration.

4. The mass of claim 1 wherein the bodies of the mass have a regular geometric configuration.

5. The mass of claim 1 wherein the bodies comprise adjacent layers of transparent thermoplastic material differing in refractive index from each other by at least about 0.1 and alternate layers are of like material.

6. The mass of claim 1 wherein the bodies have at least 50 alternating layers and the bodies have a thickness of about 1 mil.

7. A mass of synthetic resinous thermoplastic film bodies, the bodies having a thickness up to about 10 mils and the bodies being composed of a plurality of generally parallel contacting layers of transparent thermoplastic resinous material wherein at least about 20 percent of the layers have a thickness between about 0.05 micron and about 5 microns and adjacent layers differ in refractive index from each other by at least about 0.03, and the number of layers in the bodies being about at least 10, the film bodies having an iridescent appearance caused by refraction and reflection at interfaces between the layers, the bodies being distributed in a generally planar configuration on a surface of a substrate and external to the substrate and a synthetic resinous binder adhering the body to the substrate.

8. The mass of claim 7 wherein the binder is in contact with surfaces of the bodies of the mass generally adjacent the substrate.

9. The mass of claim 7 wherein the mass is generally encapsulated within the binder.

10. The mass of claim 7 wherein the bodies of the mass have a generally elongated configuration.

11. The mass of claim 7 wherein the bodies have an irregular configuration.

12. A particulate mass of iridescent synthetic resinous thermoplastic film unconnected bodies, the bodies having a thickness up to about 10 mils and the bodies being composed of a plurality of generally parallel contacting layers of transparent thermoplastic resinous material, the number of layers being at least 50, and adjacent layers differing in refractive index from each other by at least about 0.03, and alternate layers being of like material, the layers of the body having a thickness between about 0.05 micron and about 5 microns, the bodies having an iridescent appearance caused by refraction and reflection at interfaces between layers.

References Cited

UNITED STATES PATENTS

| | | | |
|---|---|---|---|
| 2,199,597 | 5/1940 | Renfrew et al. | 117—21X |
| 2,774,680 | 12/1956 | Hackney et al. | 117—33X |
| 3,170,013 | 2/1965 | Ploetz | 264—171X |
| 3,321,804 | 5/1967 | Breidt et al. | 264—171 |
| 2,582,132 | 1/1952 | Kaphan | 117—21X |
| 3,152,950 | 10/1964 | Palmquist et al. | 161—107 |
| 3,308,508 | 3/1967 | Schrenk | 264—171X |
| 3,442,755 | 5/1969 | Walters et al. | 162—168 |

WILLIAM D. MARTIN, Primary Examiner

P. ATTAGUILE, Assistant Examiner

U.S. Cl. X.R.

117—159; 156—244; 161—1, 413; 264—171